3,136,703
METHOD FOR OBTAINING FIBRINOLYSIN

Heron O. Singher, Plainfield, N.J., assignor to Ortho Pharmaceutical Corporation, a corporation of New Jersey
No Drawing. Filed Apr. 22, 1958, Ser. No. 730,064
5 Claims. (Cl. 195—66)

This invention relates to human fibrinolysin (plasmin) of such purity that it may be given intravenously, and to methods of obtaining the same. The present application is a continuation-in-part of application Serial No. 687,357, filed October 1, 1957, now abandoned.

It is well established that a proteolytic enzyme is present in normal blood in the form of an inert precursor, profibrinolysin (plasminogen), which is mainly attached to the globulin fraction, for example Cohn Fraction III$_3$. Profibrinolysin, when activated by bacterial filtrates such as staphylokinase, streptokinase, or by tissue extracts—fibrinolysokinase, is converted into fibrinolysin which attacks the coagulation proteins. Inhibitors usually present with the profibrinolysin retard this reaction.

According to the theory of Mullertz and Lassen (Proceedings of the Society of Experimental Biology and Medicine, 82, 264, 1954), streptokinase and presumably tissue kinases do not activate profibrinolysin directly but an inactive precursor of the activator which would then convert profibrinolysin to fibrinolysin. Regardless, however, of the exact mechanism of fibrinolysis, it has been shown that fibrin is aseptically dissolved by profibrinolysin activated by streptokinase.

The intrathecal use of profibrinolysin activated by streptokinase to lyse tuberculosis exudates in vivo has been reported by Fletcher in the Journal of Clinical Investigations, 33, 1242–1251 (1954). Margulis has described the use of fibrinolysin to liquify blood clots in thirty-eight patients (Archives of Surgery, 65, 511–521, 1952). The possibility of injecting fibrinolysin directly into the blood stream has aroused great interest in the preparation of a highly purified fibrinolysin that could be safely used against thrombo-embolism.

It is the object of the present invention to prepare fibrinolysin of such purity that it is completely safe for human use, even when injected intravenously.

It is another object of this invention to prepare a sterile fibrinolysin free of heterospecific activators and effective in producing the lysis of human fibrin clots.

Another object of this invention is to prepare fibrinolysin completely free of streptokinase.

Still another object of this invention is to increase the activity of the fibrinolysin by removing inhibitors.

The above-mentioned and other objects of the invention are realized by carrying out a carefully controlled activation of sterile human profibrinolysin with streptokinase to form fibrinolysin and separating the fibrinolysin so formed from all traces of the streptokinase activator.

In obtaining the new product of the present invention, one may start with a relatively impure form of profibrinolysin. Profibrinolysin can be obtained in various degrees of purity and in various fractions of human plasma. For example, in Method 10 of plasmin fractionation developed by Cohn and his associates (Journal of Clinical Investigations, 30, 99–111, 1951), profibrinolysin is found in Fractions I and III. Employing Methods 6 and 9 of Cohn, the profibrinolysin component will be concentrated in Fraction III$_3$ (see the article on "Blood Fractionation" in the Encyclopedia of Chemical Technology, published by the Interscience Encyclopedia, Inc., Brooklyn, New York). The profibrinolysin obtained from any of these fractions may be further purified by precipitating as a heavy metal salt and separating the profibrinolysin from the precipitating metal as described in co-pending application Serial No. 611,381, filed September 21, 1956.

To sterilize the profibrinolysin, it can be dissolved in concentrations of less than 10 percent (100 milligrams per milliliter), preferably 5 percent (50 milligrams per milliliter) in an aqueous solution of pH 3.0–pH 6.5, preferably pH 4. The ionic strength of this solution should lie below 0.3, preferably about 0.15. In solutions of this nature, it is possible to heat-treat profibrinolysin for 10 hours at 60° C. Profibrinolysin so treated is free of the hepatitis virus.

After profibrinolysin or profibrinolysin-containing fractions have been heat-treated, they may possess properties that mage them difficult to filter, e.g., particle size, absorption on heat-denatured materials, etc. These properties can be overcome by readjusting the pH to neutrality pH 7 (6.5–8.0) and bringing the ionic strength to 0.15–0.3 where necessary.

The fibrinolysin of the present invention is obtained by activating profibrinolysin with streptokinase. The activity of profibrinolysin may be expressed in fibrinolytic units. A description of the assay method follows the examples. The activity of streptokinase may be assayed by a modification of the method of Christenson as described in Proc. Soc. Biol. and Med., 46, 674 (1941), and is expressed in SK units. The modified Christenson assay was developed at the Lederle Laboratories and has been approved by the National Institutes of Health. In general, from one to three SK units of streptokinase are required to activate one fibrinolytic unit of profibrinolysin.

In the process of the present invention, sterile profibrinolysin is suspended in pyrogen-free water. Solution is facilitated by acidifying with hydrochloric or sulfuric acid to a pH of about 2.0–4.5. The concentration of the profibrinolysin may be about 25 milligrams per milliliter. This solution is cooled to 0° C., and the pH adjusted to between about 6.0 and 7.5 with sodium hydroxide. An excess of streptokinase is dissolved in cold pyrogen-free water to give a concentration of about 200,000 to 600,000 SK units per milliliter. The ratio of SK units of streptokinase to fibrinolytic units of profibrinolysin may be as high as 3:1 to insure complete conversion of all profibrinolysin or as low as 1:1 (stoichiometric quantities). The profibrinolysin and streptokinase solutions are mixed and brought to 25° C., for about 20 minutes. The time for activation wall vary from about five minutes to one hour, depending on the batch size. Activation of the profibrinolysin is preferablly carried out at profibrinolysin concentrations of about 10 to 50 milligrams per milliliter. Dilute solutions of profibrinolysin (less than 10 milligrams per milliliter) are unstable and more highly concentrated solutions of profibrinolysin (greater than 50 milligrams per milliliter) are activated slowly. The activation of profirinolysin is also retarded if the temperature is lowered below 25° C., i.e., to 0° C. At activation temperatures above 37° C., the fibrinolysin formed will show some loss of activity.

At the end of the activation period, the material is placed in an ice bath and the pH adjusted with a strong acid such as hydrochloric acid to between about 1.8 and 3.5. Acid insoluble impurities are precipitated at this pH. These impurities may be removed by centrifuging and discarded.

Fibrinolysin may then be recovered from solution by addition of methanol. Other sufficiently miscible water-soluble organic solvents such as ethanol or acetone may be substituted for methanol on a molar basis. If methanol is employed, it should be added to constitute between 15 percent and 50 percent of the total liquid volume (about 3.7 to about 12.3 molar solution). The amount of methanol that should be present will vary with the nature of the streptokinase employed. If insufficient methanol is present, the yield will be lowered.

After addition of the methanol, the solution of fibrinolysin is maintained at −5° C., to −7° C., until precipitation is complete. Usually about one hour is required to completely precipitate the fibrinolysin. The temperature of precipitation is quite critical as the fibrinolysin will be denatured by the organic solvent above −3° C., and other materials will precipitate from solution below −7° C. The precipitate is washed several times with a solution at the same pH, solvent concentration and temperature as was employed in precipitation. The washed precipitate is sterile, highly purified fibrinolysin. It may be suspended in pyrogen-free water and lyophilized.

EXAMPLE I

*Sterilization of Profibrinolysin*

Two and twenty-seven hundredths parts of a highly concentrated form of profibrinolysin obtained from the blood of the human placenta and assaying 9,500 fibrinolytic units of activity per milligram of dry weight are dissolved in 454 parts of distilled pyrogen-free water and the pH adjusted to 4.0 with HCl. This solution is heated at 60° C., for 10 hours and then centrifuged. The supernatant is adjusted to pH 7.2 by the addition of 1N sodium hydroxide. Three and eighty-seven hundredths parts of sodium chloride are added to the solution which is then sterile-filtered and lyophilized. The resulting product assays 13,200 units per milligram of dry weight.

EXAMPLE II

Nine hundred and fifty-four milligrams of profibrinolysin containing 13,200 fibrinolytic units per milligram of dry weight are suspended in 38 milliliters of pyrogen-free distilled water. The pH is adjusted to about 3.0 with dilute hydrochloric acid and the profibrinolysin dissolves to form a solution containing about 25 milligrams of profibrinolysin material per milliliter. This solution is cooled to 0° C., and the pH is adjusted to 6.5.

Fourteen million units of streptokinase are dissolved in 43 milliliters of cooled pyrogen-free water to form a streptokinase solution containing approximately 325,000 units of streptokinase per milliliter. The profibrinolysin and streptokinase solutions are mixed and brought to 25° C., for 20 minutes. At the end of the activation period, the material is placed in an ice bath. Dilute acid is immediately added to give a pH of 3, the solution is centrifuged, and any precipitate is discarded.

Five milliliters of methanol previously cooled to −5° C., are added at such a rate that the solution is maintained at −3° C., to −7° C., during the course of the addition and afterwards. The final volume of the solution after addition of all of the methanol amounts to 83 milliliters (6% methanol by volume). The pH is maintained during the addition of methanol and the solution is kept at −5° C., to −7° C., until precipitation is complete. About one hour is usually required for complete precipitation. The precipitate is then separated without permitting the solution to warm up above −3° C. The precipitate is removed and discarded.

Ninety-three milliliters of methanol previously cooled to −5° C., are added at such a rate that the solution is maintained at −3° C., to −7° C., during the course of the addition and afterwards. The final volume of the solution after addition of all of the methanol amounts to 176 milliliters (50% methanol by volume). The pH is maintained during the addition of methanol and the solution is kept at −5° C., to −7° C., until precipitation is complete. About one hour is usually required for complete precipitation. The precipitate is then separated without permitting the solution to warm up above −3° C. The precipitate is washed several times with a solution at the same pH, temperature and solvent concentration as is present during precipitation. The washed precipitate is suspended in water and lyophilized. The final product (Fraction I) weighs 600 milligrams and has an activity of 70,000 fibrinolytic units per milligram of nitrogen.

The mother liquor from which the fibrinolysin is precipitated by methanol may be lyophilized to obtain a second fraction of fibrinolysin (Fraction II). Fraction II weighs about 300 milligrams and has an activity of 100,000 fibrinolytic units per milligram of nitrogen.

That Fraction II contains no streptokinase is evident from the fact that it did not activate profibrinolysin. Fibrinolysin prepared according to this example, when administered to human beings, has minimal side effects and is capable of dissolving intravenous thrombi. The absence of activators and pro-activators from this product is indicated by its failure to lyze blood clots in the dog. This distinguishing characteristic is not shared by less pure fibrinolysin (see Cliffton, Ann. Surg., 139, 52–62, 1954).

The fibrinolysin (Fraction II) obtained according to the method described in Example II is soluble in both water and saline, free from prothrombin, thrombin, thromboplastin, fibrinogen, and fibrin. Fibrinolysin so obtained is incapable of clotting fibrinogen, incapable of converting prothrombin to thrombin rapidly, not inhibited by prothrombin, capable of destroying fibrinogen and fibrin, and capable of destroying prothrombin slowly. Aqueous solutions of this fibrinolysin may be treated with thrombin, fibrinogen, or a combination of fibrinogen and thromboplastin without clot formation.

Methods of preparing the profibrinolysin described in this application are claimed in copending applications Serial No. 611,382, filed September 21, 1956, now U.S. Patent No. 2,897,123, and Serial No. 708,060, filed January 10, 1958, now U.S. Patent No. 2,922,745.

In determining the activity of the profibrinolysin used in Examples I and II, the following method was employed. The House Standard sample of profibrinolysin had an activity of 11,000 units per milligram of dry weight.

*Profibrinolysin Assay Fibrin Clot Method*

A. SOLUTIONS (1) Saline—0.9 percent. Dissolve 9 grams of sodium chloride C.P. in 1000 milliliters of distilled water.

(2) Standard Profibrinolysin—House Standard. Ten milligrams are weighed on an analytical balance and diluted to 1000 milliliters with saline in a volumetric flask. Make fresh each time.

(3) Unknown solutions—

10 milligrams in 1000 milliliters of saline  
20 milligrams in 1000 milliliters of saline  
20 milligrams in 500 milliliters of saline  
30 milligrams in 500 milliliters of saline  
20 milligrams in 250 milliliters of saline  
10 milligrams in 100 milliliters of saline  
20 milligrams in 10,000 milliliters of saline  
20 milligrams in 5000 milliliters of saline Use 0.4 milliliter per test. Make fresh each time.

(4) Phosphate saline buffer—0.1 mole monosodium phosphate dissolved in about 600 milliliters of saline in a liter volumetric flask adjusted to pH 7.4 with sodium hydroxide and make to volume. Use 2 milliliters per test. May be stored.

(5) Fibrinogen gelatin solution—use 2 milliliters per test. Solution contains 2.5 grams of gelatin and 0.5 grams of bovine fibrinogen (Fraction I). Heat 50 milliliters of phosphate saline buffer to boiling, remove from heat and stir in gelatin. Cool to 37° C., and adjust to 50 milliliters with distilled water. Add gelatin solution to 0.5 gram of fibrinogen and mix with a stirring rod in 37° C., water bath until the fibrinogen is dissolved. Keep at 37° C., until used. Make fresh each day.

(6) Streptokinase—Varidase. Dissolve a 20,000 unit vial in 4 milliliters of saline. Use 0.05 milliliter, 250 units, per test. Make fresh each day.

(7) Thrombin—dissolve thrombin in sufficient saline to give 10 National Institutes of Health units per 0.05 milliliter. Use 0.05 milliliter per test. Make fresh each day.

B. METHOD (1) Set up 10 pairs of photoelectric colorimeter tubes in a rack and number 1 to 10 in duplicate.
(2) To pairs 1 to 9, add 2 milliliters of phosphate saline buffer.
(3) To pair 10, add 2.4 milliliters of phosphate saline buffer (negative control).
(4) To pair 1, add 0.4 milliliter of standard profibrinolysin.
(5) To pairs 2 to 9, add 0.4 milliliter of appropriate unknown.
(6) Add 2.0 milliliters of fibrinogen gelatin to each tube.
(7) Add 0.1 milliliter of saline to the first tube of each pair.
(8) Add 0.05 milliliter of streptokinase to the second tube of each pair.
(9) Mix tubes placing a square of Parafilm over each tube and inverting thrice.
(10) Place racks with tubes in constant temperature water bath at 25° C., immersing to the level of the reagents.
(11) Have photoelectric colorimeter adjusted, wave length 660 mu.
(12) Add 0.05 millliliter of thrombin solution to the second tube of each pair, one every minute in succession. Mix each tube after addition. Start timing from the addition to tube 1.
(13) Use first tube of pair 10 to adjust sensitivity.
(14) Use first tube of each pair for zero adjustment (100% transmission) and read transmission before reading transmission of the second tube of the pair. The first reading is made on pair 1 about 10 minutes after the addition of thrombin to tube 1.
(15) Read each pair one minute after the preceding pair and once every ten minutes until the second tube of each pair reads 100 percent transmission or until 120 minutes have passed. Record time and transmission for each reading.

C. CALCULATIONS

½ lysis.—Subtract the first reading from 100 percent and divide the difference by two and add this to the first reading. This value is the present transmission at ½ lysis.

½ lysis time.—Make a linear graph plotting transmission on the ordinate and time in minutes on the abscissa. Plot the readings on either side of the calculated ½ lysis. Connect the points and read from the graph the time, corresponding to the calculated ½ lysis. This then shows the ½ lysis time.

Employing the graph of ½ House Standard (½ lysis time plotted on the ordinate against the units of activity per milligram of House Standard profibrinolysin plotted on the abscissa), check the ½ lysis time of the unknown against the House Standard. Read the unitage off the curves for each ½ lysis time of the unknown.

$$\frac{Unitage}{0.4} \times \frac{milliliters\ of\ saline}{milligrams\ in\ solution}$$
= activity of units per milligram of dry weight To report the activity in units per milligram of nitrogen, the percent nitrogen in the sample is determined by a Kjeldahl analysis. Then:

$$\frac{Activity\ in\ units\ per\ milligram\ dry\ weight \times 100}{Percent\ nitrogen}$$
= activity in units per milligram of nitrogen The above method may also be employed to assay fibrinolysin by substituting a fibrinolysin House Standard having an activity of 11,000 units per milligram of dry weight for the profibrinolysin House Standard. In the assay of fibrinolysin, it is unnecessary to make up solution 6 (streptokinase-varidase) and step 8 of the method is eliminated.

What is claimed is:
1. Method for obtaining human fibrinolysin which comprises treating human profibrinolysin in an aqueous solution at a temperature of about 25° C., and a pH between about 6 and 7.5 with sufficient streptokinase to convert all of said profibrinolysin to fibrinolysin; cooling the solution of fibrinolysin and acidifying to a pH between about 1.8 and 3.5 to precipitate impurities; separating the precipitated impurities from said solution, adding to the solution a miscible water soluble organic solvent at a temperature between −3° C., and −7° C.; maintaining the solution between −3° C., and −7° C., until most of the fibrinolysin is precipitated, and separating the precipitated fibrinolysin.

2. A method according to claim 1 in which the miscible water soluble organic solvent is methanol.

3. A method according to claim 1 in which the miscible water soluble organic solvent is ethanol.

4. A method according to claim 1 in which the miscible water soluble organic solvent is acetone.

5. Method for obtaining human fibrinolysin which comprises treating human profibrinolysin in an aqueous solution at a temperature of about 25° C., and a pH between about 6 and 7.5 with sufficient streptokinase to convert all of said profibrinolysin to fibrinolysin; cooling the solution of fibrinolysin and acidifying to a pH between about 1.8 and 3.5 to precipitate impurities; separating the precipitated impurities from said solution, adding to the solution about 6% methanol by volume at a temperature between −3° C., and −7° C.; separating and discarding any precipitate that forms, adding to the solution additional methanol at a temperature between −3° C., and −7° C., until the solution is about 50% methanol by volume; maintaining the solution between −3° C., and −7° C., until most of the fibrinolysin is precipitated, and separting the precipitated fibrinolysin.

References Cited in the file of this patent
UNITED STATES PATENTS
2,624,691    Loomis _____ Jan. 6, 1953

OTHER REFERENCES

Grosse et al.: Surgery (1955), 37, 794–801. POSL: RD–1–S78.

Remmert et al.: Jour. Biol. Chem. 181, November 1949, pp. 431–448.

Chemical Abstracts, vol. 51, pages 10703b c; 11519i.

Biochemical Journal, vol. 61, pages 424 to 434, 1955, Cambridge University Press, London.

Mullertz: Acta Physiologica Scandinavica, vol. 38, Supplement 130, Copenhagen (1956), pages 1 to 64, (pages 43, 47, 49–51 and 56 particularly relied upon).

Fletcher et al.: Journal American Medical Association, vol. 172 pages 912 to 915, February 27, 1960.

Clifton, E. E., et al.: Jour. Applied Physiol 6, July 1953, pp. 42–50.